US007925485B2

(12) United States Patent
D'Amora et al.

(10) Patent No.: US 7,925,485 B2
(45) Date of Patent: Apr. 12, 2011

(54) SYSTEM AND APPARATUS FOR MANAGING LATENCY-SENSITIVE INTERACTION IN VIRTUAL ENVIRONMENTS

(75) Inventors: Bruce D. D'Amora, New Milford, CT (US); Ashwini K. Nanda, Mohegan Lake, NY (US); James R. Moulic, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1204 days.

(21) Appl. No.: 11/552,709

(22) Filed: Oct. 25, 2006

(65) Prior Publication Data

US 2008/0102955 A1 May 1, 2008

(51) Int. Cl.
G06F 17/50 (2006.01)
G06G 7/62 (2006.01)
(52) U.S. Cl. ........... 703/13; 709/203; 709/205; 709/231
(58) Field of Classification Search ...................... 703/13
See application file for complete search history.

(56) References Cited

U.S. PATENT DOCUMENTS

| | | | | |
|---|---|---|---|---|
| 6,415,317 B1 * | 7/2002 | Yelon et al. | ...................... | 709/205 |
| 6,557,041 B2 * | 4/2003 | Mallart | ............................ | 709/231 |
| 6,628,287 B1 * | 9/2003 | Duda et al. | ...................... | 345/475 |
| 6,868,434 B1 * | 3/2005 | Terranova et al. | ............ | 709/203 |
| 7,373,500 B2 * | 5/2008 | Ramelson et al. | ............ | 713/150 |
| 7,642,989 B2 * | 1/2010 | Cheong et al. | ................. | 345/2.1 |
| 2005/0278642 A1 * | 12/2005 | Chang et al. | .................... | 715/751 |

OTHER PUBLICATIONS

Safaei et al, "Latency-Driven Distribution: Infrastructure Needs of Participatory Entertainment Applications", IEEE Communications Magazine, May 2005, pp. 106-112.*
Kranzlmuller et al, "Optimizations n the Grid Visualization Kernel", Proceedings of the 16th International Parallel and Distributed Processing Symposium, 2002.*
Brodlie et al, "Distributed and Collaborative Visualization", Computer Graphics Forum, vol. 23, No. 2, pp. 223-251, 2004.*
Hamza-Lup et al, "Adaptive Scene Synchronization for Virtual and Mixed Reality Environments", Proceedings of the 2004 IEEE Virtual Reality (VR'04), Mar. 27-31, Chicago, IL.*
Macedonia et al, "A Taxonomy for Networked Virtual Environments", IEEE MultiMedia, vol. 4, No. 1, pp. 48-56, Jan.-Mar. 1997.*

* cited by examiner

*Primary Examiner* — Mary C Jacob
(74) *Attorney, Agent, or Firm* — Michael Lestrange; Roberts Mlotkowski Safran & Cole, P.C.

(57) ABSTRACT

A structure and method comprises a data structure representing a characteristic of an object in the virtual interactive environment. The device further comprises a client simulator to perform a first simulation of the characteristic of the object in the virtual interactive environment and a server simulator to perform a second simulation of the characteristic of the object in the virtual interactive environment. The device further comprises a synchronizer to synchronize the first and the second simulations.

19 Claims, 2 Drawing Sheets

SYSTEM AND APPARATUS FOR MANAGING LATENCY-SENSITIVE INTERACTION IN VIRTUAL ENVIRONMENTS

FIELD OF THE INVENTION

The invention relates generally to virtual interactive environments, and more specifically, a system and method for managing latency-sensitive interaction in virtual interactive environments.

BACKGROUND OF THE INVENTION

Computer systems running interactive virtual environments (such as, for example, video games or flight simulators) may be run in client/server environments. The client and server may communicate via a computer network (such as, for example, a proprietary network, or the Internet). In such a client/server environment, the simulation of the virtual interactive environment is typically partitioned. That is, either the client or the server performs the simulation of the virtual interactive environment.

Whether the client or the server performs the simulation, the simulation is the determination of the subsequent state of the virtual interactive environment. Given the relevant characteristics of objects in a virtual interactive environment in a current state, the simulation determines each of the subsequent relevant characteristics in a subsequent state. For example, in a first state of the virtual interactive environment, a ball may be red, and deformed upon impact with the ground. In a subsequent state, the ball may still be red, but may be bouncing upwards at a certain speed. For each subsequent state, the simulation determines each of these characteristics, such as, for example, size, color, deformity, velocity, direction, rotation vectors, etc., based at least upon the characteristics of the previous state.

When the client computes the simulation, the response time to the user input may be optimized, as this eliminates the latency caused by communication with the server. Therefore, historically, calculations for interactive virtual environments have typically been processed on the client.

Some interactive virtual environments, though, have become so complex that the processing demands may exceed the capabilities of the single processor available on the client. For example, the simulation of running water is relatively compute intensive. Additionally, multi-user virtual interactive environments typically require more computing power. The server, which will normally have more computing power than the client, is often better suited to perform such sophisticated simulations. This approach, though, has the limitation discussed above, namely, communication with the server delays the response time.

Accordingly, a need has developed in the art for overcoming the above problem.

SUMMARY OF THE INVENTION

In a first aspect of the invention, a device comprises a data structure representing a characteristic of an object in the virtual interactive environment. The device further comprises a client simulator to perform a first simulation of the characteristic of the object in the virtual interactive environment and a server simulator to perform a second simulation of the characteristic of the object in the virtual interactive environment. The device further comprises a synchronizer to synchronize the first and the second simulations.

In a second aspect of the invention, an apparatus comprises a mechanism for simulating a virtual interactive environment by at least one of interpolation, extrapolation, and approximation. The apparatus further comprises a mechanism for receiving on a server computer a state of the virtual interactive environment as it exists on a client computer. The apparatus further comprises a mechanism for synchronizing a state of the virtual interactive environment as it exists on the server with a state of the virtual interactive environment as it exists on the client computer to provide a refined simulation on the client computer. The apparatus further comprises a mechanism for transmitting to the client computer a state of the virtual interactive environment as it exists on the server.

In a third aspect of the invention, a method comprises simulating a virtual interactive environment by at least one of interpolation, extrapolation, and approximation. The method further comprises receiving on a server computer a state of the virtual interactive environment as simulated on a client computer. The method further comprises transmitting to the client computer a state of the virtual interactive environment as simulated on the server. The method further comprises synchronizing a state of the virtual interactive environment as simulated on the server computer with a state of the virtual interactive environment as simulated on the client computer to provide a refined simulation on the client computer.

In a fourth aspect of the invention, a computer program product comprises a computer useable medium including a computer readable program, wherein the computer readable program when executed on a computer causes the computer to simulate a virtual interactive environment on a client computer, and simulate a virtual interactive environment on a server computer. The computer program product further causes the computer to transmit to the client computer a state of the virtual interactive environment as it exists on the server computer, and transmit to the server computer a state of the virtual interactive environment as it exists on the client computer. The computer program product further causes the computer to synchronize a state of the virtual interactive environment as it exists on the server computer with a state of the virtual interactive environment as it exists on the client computer.

DETAILED DESCRIPTION OF EMBODIMENTS OF THE INVENTION

The invention relates to managing latency-sensitive interaction in virtual environments. In embodiments, the invention more specifically relates to a system and a method for simulating a virtual interactive environment in a client/server environment, and such that the latency caused by communication between the client and server is minimized or eliminated, and such that the processing power of the server is accessed.

According to an aspect of the present invention, the method includes identifying certain properties of the communication of the client and the server, such as, for example, the latency and the bandwidth. These properties may be stored in a table or other suitable data structure format. These properties may vary not only from one network to another, but also from one client to another, even within the same network, depending upon factors such as the client's distance from the server, and the quality of the network connection.

According to yet another aspect of the present invention, the method includes identifying a latency threshold, which may also be stored in a table or other suitable data structure format. The latency threshold will be used to determine whether a simulation will be performed by the server, or in parallel by both the client and the server. For example, a user may perform an action that would preferably be simulated within a sixteenth of a second. It may, though, take longer than that amount of time to communicate the user input to the server, to process that information at the server, and then to communicate the server's response back to the client. In this case, the client will perform a simulation to ensure that the system response time does not exceed the latency threshold. The simulation performed by the client may be a more coarse simulation than that which would have been performed by the server.

In embodiments, the user input will also be transmitted to the server, and the server will also perform a simulation. The simulation performed by the server may be a more refined simulation than that which was performed by the client. The server has access to information about the entire virtual world which it can leverage to produce a more accurate simulation. The server simulation will be transmitted back to the client, and the differences between the client simulation and the server simulation will be resolved.

Figure 1:
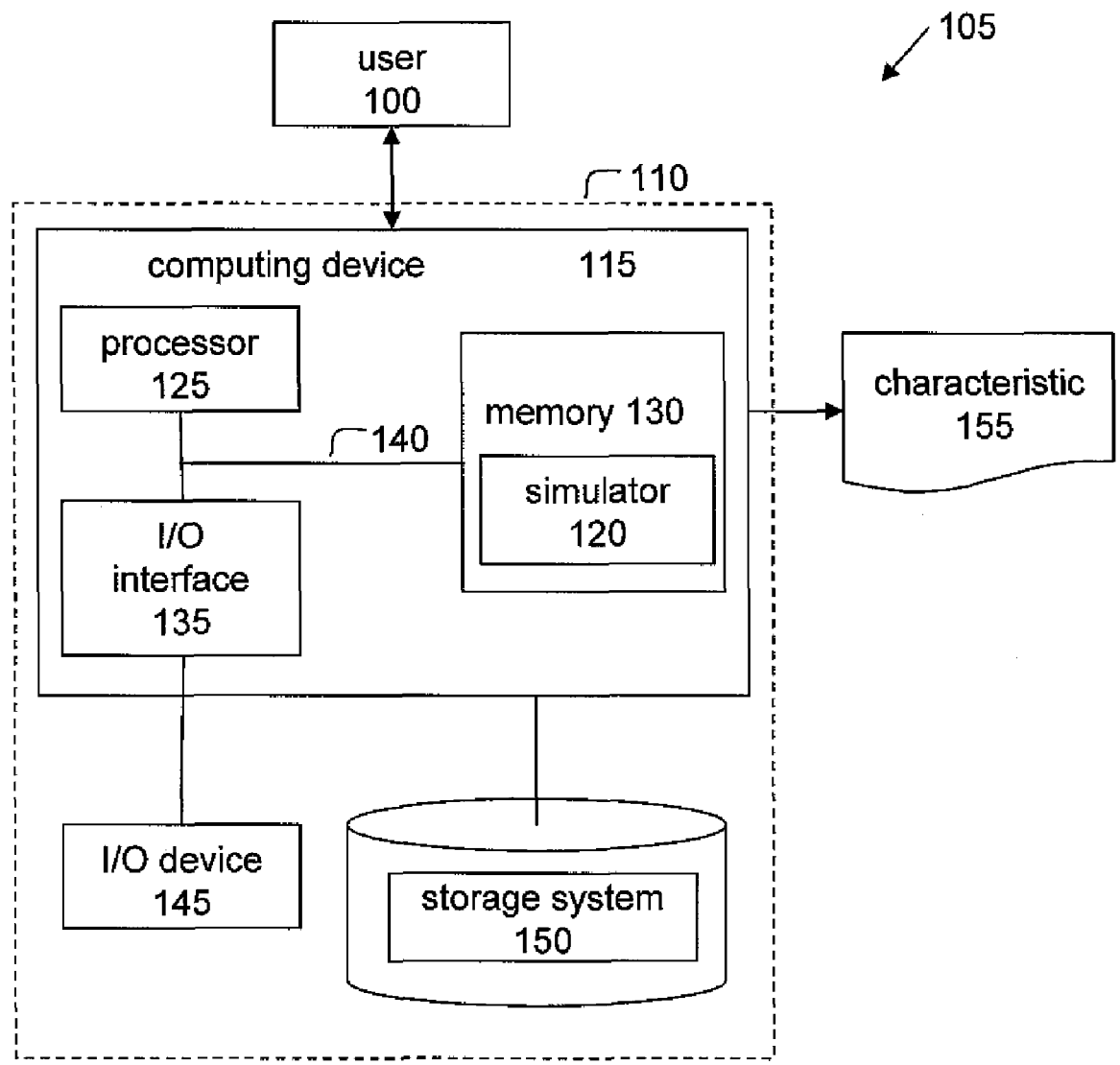
FIG. 1 shows an environment for implementing an aspect of the invention.

With reference to the accompanying drawings, FIG. 1 shows a user 100 and an illustrative environment 105 for managing the processes in accordance with embodiments of the invention. To this extent, the environment 105 includes a computer infrastructure 110 that can perform the processes described herein, such as, for example, simulation of a virtual interactive environment. In particular, the computer infrastructure 110 is shown including a computing device 115 that comprises a simulator 120, which makes computing device 115 operable to perform at least some of the processes described herein. The computing device 115 is shown including a processor 125, a memory 130, an input/output (I/O) interface 135, and a bus 140. Further, the computing device 115 is shown in communication with an external I/O device/resource 145 and a storage system 150. As is known in the art, in general, the processor 125 executes computer program code, which is stored in memory 130 and/or storage system 150. While executing computer program code, the processor 125 can read and/or write data to/from memory 130, storage system 150, and/or I/O interface 135. The bus 140 provides a communications link between each of the components in the computing device 115. The I/O device 145 can comprise any device that enables an individual to interact with the computing device 115 or any device that enables the computing device 115 to communicate with one or more other computing devices using any type of communications link.

In any event, the computing device 115 can comprise any general purpose computing article of manufacture capable of executing computer program code installed thereon (e.g., a personal computer, server, handheld device, etc.). However, it is understood that the computing device 115 is only representative of various possible equivalent computing devices that may perform the processes described herein. To this extent, in other embodiments, the functionality provided by computing device 115 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 110 is only illustrative of various types of computer infrastructures for implementing the invention. For example, in one embodiment, the computer infrastructure 110 comprises two or more computing devices (e.g., a client and a server) that communicate over any type of communications link, such as a network, a shared memory, or the like, to perform the process described herein. Further, while performing the process described herein, one or more computing devices in the computer infrastructure 110 can communicate with one or more other computing devices external to computer infrastructure 110 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols. As discussed herein, the simulator 120 enables computer infrastructure 110 to set the characteristic 155 of the object in the virtual interactive environment.

Figure 2:
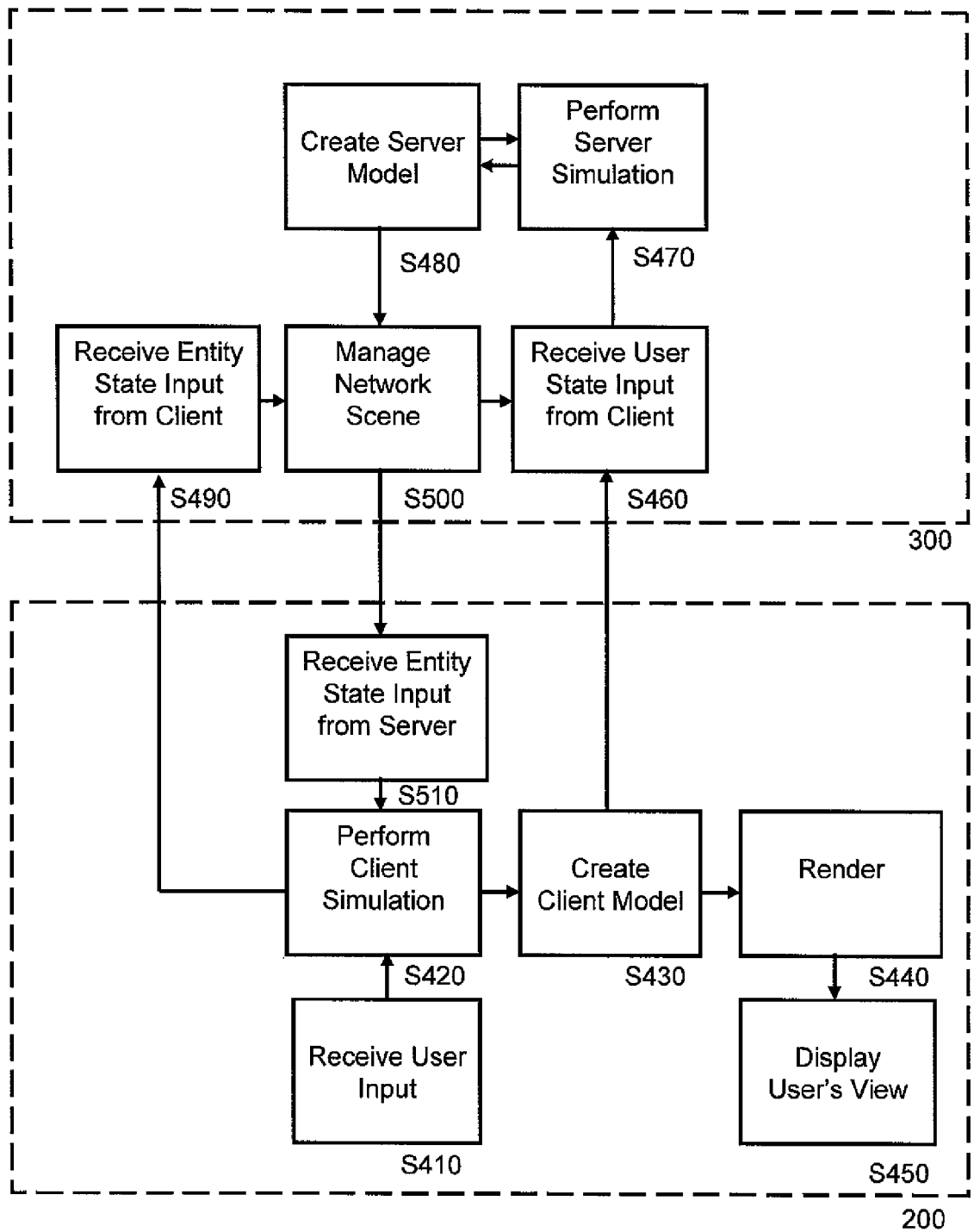
FIG. 2 is an illustrative example of the sequence of operations in a flow.

Referring to FIG. 2, the method of the present invention may be implemented in a computing environment comprising a client device 200 and a server device 300, in which the client 200 is in communication with the server 300 via a network. At S410, the client 200 receives input form a user. This user input may be any known form of user input, such as, for example, through a keyboard, a mouse, a joystick, or a touch screen.

In embodiments, the client 200 determines whether the response time from the server will exceed an established threshold. The client 200 bases this decision on certain properties of the communication between the client 200 and the server 300, such as, for example, the latency and/or the bandwidth of the communications network. These properties may be established upon login to the network or application set-up, and may be stored in a table format which can be updated over time while the users are interacting with their virtual environment. This update may be necessary because large computer systems may not be static in their performance characteristics due to system failures, varying workloads, etc. If the client 200 determines that the response time from the server will exceed the established threshold which also may vary for different types of inputs, for example, virtual swing of a baseball bat may require faster response than fielding an outfield fly ball, then the client may perform a simulation of the user input, rather than wait for a response from the server 300.

At S420, the client 200 performs a client simulation based upon: (1) an initial state of the virtual interactive environment; and (2) the user input received at S410. The client simulation depicts the subsequent state of the virtual interactive environment. The client simulation comprises the user state and the entity state. For example, in a virtual interactive environment simulating flight, the user state comprises information regarding the plane's characteristics (for example, altitude, speed, direction, etc.) and the entity state comprises information regarding the remainder of the environment (for example, other planes, conditions on the ground, etc.). Additionally, the client simulation may be based upon input received from the server 300. The input from the server 300 is discussed in greater detail below.

The client simulation performed at S420 may be a relatively coarse simulation. This client simulation may be extrapolated or interpolated or otherwise estimated, approximated, or averaged in order to approximate the more refined simulation that will be performed on the server 300. When extrapolating, the client 200 may perform a coarse simulation based upon the characteristics of each object in the previous state. When interpolating, the client 200 may perform a coarse simulation based upon: (1) the characteristics of each object in the previous state; and (2) input received from the server 300 predicting the subsequent state.

At S430, the client 200 creates the client model of the subsequent state of the virtual interactive environment based upon the client simulation performed at S420. It will be understood of skill in the art that at S440, the client model is rendered based upon the client simulation and at S450 the rendering is displayed to the user.

At S460, the server 300 receives user state input from the client 200. (It will be understood by one of skill in the art that, in embodiments, any communication between the client 200 and the server 300 may be initiated by the client 200 or the server 300 and may or may not be in response to a request or query. Therefore, the communications described herein may be equally portrayed as "transmitted" or "received".) The user state input received at S460 reports the subsequent state of the user as simulated by the client 200. For example, at this process, the client is queried for information, the server receives the information and assimilates state changes from the client based on, for example, motion, position, change, latency of action, etc. This information may be based on any action of the client such as joystick movement, mouse movement, or keyboard strokes.

At S470, the server 300 performs the server simulation based upon: (1) an initial state of the virtual interactive environment; and (2) the user state input received at S460. Like the client simulation performed at S420 and discussed above, the server simulation comprises the user state and the entity state. The server simulation, though, incorporates input from any other users, and may be a more refined simulation that performed by the client 200. Where the client simulation may have extrapolated or interpolated, or otherwise estimated, approximated, or averaged, the characteristic(s) of an object, the server simulation depicts the actual characteristic(s) of that object in the virtual interactive environment. For example, in the flight simulation example discussed above, the client simulator may have extrapolated from the current state of the world that the desert under the user's plane continues to the horizon, whereas, the server simulation might depict a mountain range on the horizon. The server simulation is based in part upon the user state input received from each user, and upon the initial server model (discussed in greater detail below).

At S480, the server 300 creates the server model of the subsequent state of the world based upon the server simulation performed at S470. The server simulation and the server model create an information loop, such that each update of the server model is based upon the most recent simulation, and each server simulation is based upon the most recent server model.

At S490, the server receives entity state input from the client 200. The entity state input is based, in embodiments, on the client model. In contrast with the user state input received at S460, the entity state input comprises information regarding the characteristics of objects other than the user's object. That is, where the client 200 has extrapolated or interpolated or otherwise estimated, approximated, or averaged, the actions of objects other than the user's object in order to perform a coarse simulation, the client 200 communicates this coarse simulation to the server 300.

At S500, the server 300 manages the network scene based on inputs at S480 and S490. In this processing state, the relatively coarse client simulation may be synchronized with the more refined server simulation. This synchronization may be a substantially real-time process, and may be used to validate and resolve state differences between the client and the server computers. Additionally, the server 300 may predict a future state of the virtual interactive environment.

At S510, the client 200 receives entity state input from the server. This information comprises the synchronized subsequent state of the virtual interactive environment. Additionally, this information may comprise predicted entity state information from the server. The entity state input from server received at S510 may be transmitted with some regular frequency, or may be transmitted as deemed necessary based upon the extent of the differences between the client simulation and the server simulation. The information is assimilated accurate information received from the server based on, for example, simulation, latency, and bandwidth requirements.

The client simulation performed at S420 (discussed in greater detail above) may be based in part on the entity state input from server received at S510. If so, the synchronized subsequent state of the virtual interactive environment will be incorporated into the next client simulation. In an embodiment, the synchronized entity state input will be incorporated at a point in the client simulation when it will be less noticeable to the user. For example, in the flight simulation environment discussed above, if the client has simulated a desert continuing on to the horizon, but the server 300 later transmitted a server simulation depicting mountains on the horizon, the mountains may be incorporated into the client simulation after the user's plane emerges form a cloud, with the result that the user is not distracted by the sudden appearance of an object that was not previously depicted. Preferably, the client simulation is synchronized with the server simulation before the client simulation diverges from the server simulation to such an extent that the user would notice when the synchronization occurs. The synchronization can be transitioned or blended in over several frames to avoid a popping effect. For example, if one performed a client simulation on a very coarse representation of an object to reduce the compute requirements and the server simulation was performed on a very detailed representation, it is possible to transition the server output into the client state over several frames.

Additionally, if the entity state input from server comprises predicted entity state information, then the client simulation may interpolate the subsequent state based in part upon the predicted state. For example, in the flight simulation environment discussed above, based on the assumption that the user will continue to fly in approximately the same direction and at approximately the same speed, the server 300 may transmit to the client 200 a predicted entity state including a server simulation of the mountains on the horizon. In this case, if the user does not continue to fly as predicted, then the client 200 may base its interpolation performed at S420 on the predicted entity state, and incorporate the mountains into the client simulation.

An example of pseudo code is provided below.

```
.....
server beings execution at time, t0
server computes initital state
server performs several simulations based on initial force vectors
while players exist do
    loop at 100 frames per second
        server sends resulting state(s) to client
        server gets new input from client
        server performs new simulations
    end loop
done
```

```
client begins execution at time t0
while play continues do
    loop at 50 frames per second
        client gets input
        decide if simulation can be performed on client or server
            if client perform based on current input and previous state
    supplied from server
            else perform on server
        render new frame
    end loop
done
```

While the invention has been described in terms of embodiments, those skilled in the art will recognize that the invention can be practiced with modifications and in the spirit and scope of the appended claims.

What is claimed is:

1. A computing device comprising:
   a data structure representing a characteristic of an object or objects in a virtual interactive environment;
   a client simulator to perform a first simulation of the characteristics of the object or objects in the virtual interactive environment until a system response time exceeds a latency threshold;
   a server simulator to perform a second simulation of the characteristics of the object or objects in the virtual interactive environment; and
   a synchronizer to synchronize the first and the second simulations.

2. The computing device of claim 1, wherein the second simulation is a more refined simulation than the first simulation.

3. The computing device of claim 1, wherein:
   a server computer receives the first simulation from a client computer; and
   the server computer transmits a synchronized simulation to the client computer.

4. The computing device of claim 1, further comprising a data structure of network properties, comprising latency or bandwidth of the network.

5. The computing device of claim 1, wherein the server simulator performs a second simulation of the characteristics of the object or objects in the virtual interactive environment when the response time is less than a latency threshold.

6. A device comprising:
   a data structure representing a characteristic of an object or objects in a virtual interactive environment;
   a client simulator to perform a first simulation of the characteristics of the object or objects in the virtual interactive environment;
   a server simulator to perform a second simulation of the characteristics of the object or objects in the virtual interactive environment;
   a synchronizer to synchronize the first and the second simulations;
   a data structure of network properties, comprising latency or bandwidth of the network; and
   a processor which consults the data structure of network properties to determine whether the client simulator will perform the first simulation.

7. An apparatus comprising:
   means for simulating a virtual interactive environment by at least one of interpolation, extrapolation, and approximation;
   means for receiving on a server computer a state of the virtual interactive environment as it exists on a client computer;
   means for synchronizing a state of the virtual interactive environment as it exists on the server with a state of the virtual interactive environment as it exists on the client computer to provide a refined simulation on the client computer;
   means for transmitting to the client computer a state of the virtual interactive environment as it exists on the server; and
   means for determining whether the client computer will wait for input from the server computer, based upon network latency or bandwidth requirements.

8. The apparatus of claim 7, wherein the means for simulating comprises a simulator.

9. The apparatus of claim 7, wherein the means for receiving is on the server computer.

10. The apparatus of claim 7, further comprising means for managing a network scene.

11. The apparatus of claim 7, further comprising performing a server simulation based on a created server model.

12. A method comprising:
    simulating a virtual interactive environment by at least one of interpolation, extrapolation, and approximation;
    receiving on a server computer a state of the virtual interactive environment as simulated on a client computer;
    transmitting to the client computer a state of the virtual interactive environment as simulated on the server;
    synchronizing a state of the virtual interactive environment as simulated on the server computer with a state of the virtual interactive environment as simulated on the client computer to provide a refined simulation on the client computer; and
    determining whether the client computer will wait for input from the server computer, based upon network latency or bandwidth requirements.

13. The method of claim 12, wherein the synchronizing step is performed by at least one of verifying, validating, and resolving differences.

14. The method of claim 12, further comprising assimilating the state of the virtual interactive environment as simulated on the server computer into the simulation on the client computer.

15. The method of claim 12, further comprising determining an optimal point at which to perform the step of assimilating.

16. A computer program product comprising a computer useable storage medium including a computer readable program, wherein the computer readable program when executed on a computer causes the computer to:
    simulate a virtual interactive environment on a client computer;
    simulate a virtual interactive environment on a server computer;
    transmit to the client computer a state of the virtual interactive environment as it exists on the server computer;
    receive on the server computer a state of the virtual interactive environment as it exists on the client computer; and
    synchronize a state of the virtual interactive environment as it exists on the server computer with a state of the virtual interactive environment as it exists on the client computer,
    wherein the computer readable program further causes the computer to simulate the virtual interactive environment on the client computer when communication with the server computer exceeds a latency threshold.

17. The system of claim 16, wherein the computer readable program further causes the computer to determine an optimal time at which to assimilate the synchronized simulation of the virtual interactive environment as it exists on the server computer with the simulation of the virtual interactive environment as it exists on the client computer.

18. The system of claim 16, wherein the simulation performed by the client computer is a more coarse simulation than that performed by the server computer.

19. The system of claim 16, wherein the simulation on the client computer is performed by at least one of by at least one of interpolation, extrapolation, or approximation.

* * * * *